US010305844B2

(12) United States Patent
Liyanage et al.

(10) Patent No.: US 10,305,844 B2
(45) Date of Patent: May 28, 2019

(54) CONVERSION TRACKING OF ORGANIC CONTENT IN A SOCIAL NETWORKING SYSTEM

(71) Applicant: Facebook, Inc., Menlo Park, CA (US)

(72) Inventors: Janaka Liyanage, Mountain View, CA (US); David Gross-Baser, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1238 days.

(21) Appl. No.: 13/752,148

(22) Filed: Jan. 28, 2013

(65) Prior Publication Data
US 2014/0214964 A1 Jul. 31, 2014

(51) Int. Cl.
H04L 29/06 (2006.01)
H04L 12/58 (2006.01)

(52) U.S. Cl.
CPC .................... H04L 51/32 (2013.01)

(58) Field of Classification Search
CPC ............... H04L 67/22; H04L 51/32
USPC ........................................ 709/205
See application file for complete search history.

(56) References Cited

U.S. PATENT DOCUMENTS

| 8,676,875 | B1* | 3/2014 | Smith et al. | 709/200 |
| 8,694,542 | B2* | 4/2014 | Tiu, Jr. | H04L 51/32 707/778 |
| 2007/0124789 | A1* | 5/2007 | Sachson | G06Q 30/00 725/117 |
| 2010/0198772 | A1* | 8/2010 | Silverman | G06Q 30/02 706/52 |
| 2011/0218846 | A1* | 9/2011 | Fieldman et al. | 705/14.16 |
| 2011/0218847 | A1* | 9/2011 | Razzaque et al. | 705/14.16 |
| 2011/0302025 | A1* | 12/2011 | Hsiao | G06Q 30/02 705/14.42 |
| 2012/0084349 | A1* | 4/2012 | Lee | G06Q 30/02 709/203 |
| 2012/0221387 | A1* | 8/2012 | Liu et al. | 705/14.16 |
| 2013/0018777 | A1* | 1/2013 | Klein | 705/38 |
| 2013/0066706 | A1* | 3/2013 | Wu et al. | 705/14.42 |
| 2013/0073280 | A1* | 3/2013 | O'Neil et al. | 704/9 |
| 2013/0124189 | A1* | 5/2013 | Baldwin | G06F 17/27 704/9 |
| 2013/0132177 | A1* | 5/2013 | Ha | 705/14.19 |
| 2014/0019261 | A1* | 1/2014 | Hegeman et al. | 705/14.71 |
| 2014/0033074 | A1* | 1/2014 | Thibaux | G06Q 50/01 715/753 |
| 2014/0089402 | A1* | 3/2014 | Liyanage et al. | 709/204 |
| 2014/0114763 | A1* | 4/2014 | Oestlien et al. | 705/14.55 |
| 2014/0280206 | A1* | 9/2014 | Krishnamurthy et al. | 707/748 |

* cited by examiner

Primary Examiner — Ario Etienne
Assistant Examiner — Elizabeth Kassa
(74) Attorney, Agent, or Firm — Fenwick & West LLP

(57) ABSTRACT

A user posting content to a social networking system provides a conversion definition along with the content. The conversion definition identifies a type of interaction associated with the content, such as type of interaction with the content that the user would like to track. After the content is presented to additional users, the social networking system identifies additional users performing the type of interaction with the content identified by the conversion definition. One or more metrics describing the interactions of the type of interaction associated with the content are provide to the user that posted the content.

16 Claims, 5 Drawing Sheets

CONVERSION TRACKING OF ORGANIC CONTENT IN A SOCIAL NETWORKING SYSTEM

BACKGROUND

This invention relates generally to social networking systems and in particular to tracking conversions in connection with organic (i.e., not sponsored) content in a social networking system.

Social networking system users become engaged with other social networking system users by sharing photos, real-time status updates, and playing social games. The social networking environment also offers brand owners the ability to communicate with their customers and potential customers. Other users may then interact with the content posted to the system, such as by commenting on, liking, sharing, or performing various actions allowed by the system. But users and brand owners who post content to the system may not be able to see these interactions easily. For example, if a brand owner wants to see how many of its customers have comments on a picture that the brand owner posted to the social networking system, the brand owner may have to revisit the picture continually and count the number of comments. Moreover, many other interactions, such as views and shares, may not be visible to the brand owner at all. And even where the brand owner might manually review these interactions, information broken down by demographics may be impossible to obtain.

SUMMARY

Embodiments of the invention provide users of a social networking system who post content to the system a mechanism to define a conversion event for an individual post and then view information about other users who have performed the defined conversion event in connection with that post. The conversion event may comprise any action that another user may take in connection with posted content, such as view, tag, comment, like, or share, just to name a few examples. The posting user may be any user in eth social networking system or a brand owner posting on behalf of a brand page. After the user posts the content with a defined conversion event, the social networking system tracks information about other users who perform that conversion event in connection with the posted content. This tracked conversion information may then be displayed to the posting user, possibly further divided by demographic information. By enabling a user to define and view conversions for individual posts, users of the social networking system have greater flexibility to track various types of interactions with their posted content on a highly targeted basis.

In one embodiment, a user providing a content item to a social networking system for distribution to other users associates a conversion definition with the content item. The conversion definition identifies a type of interaction with the content item to be tracked and/or analyzed. Hence, the user providing the content item may identify one or more types of interactions with the content item of interest to the providing user. This allows the providing user to customize the interactions with the content item by social networking system users, allowing the providing user to more readily obtain information describing specific types of interactions with the content item.

After receiving the content item and the conversion definition, the social networking system presents the content item to additional users and captures interactions with the content item by the additional users. Captured interactions having the type of interaction specified by the conversion definition are retrieved and analyzed to generate one or more metrics that are presented to the user providing the content item. For example, a number of unique interactions having the specified type of interaction within a time interval or a frequency with which interactions having the specified type of interaction occurred are determined.

Figure 1:
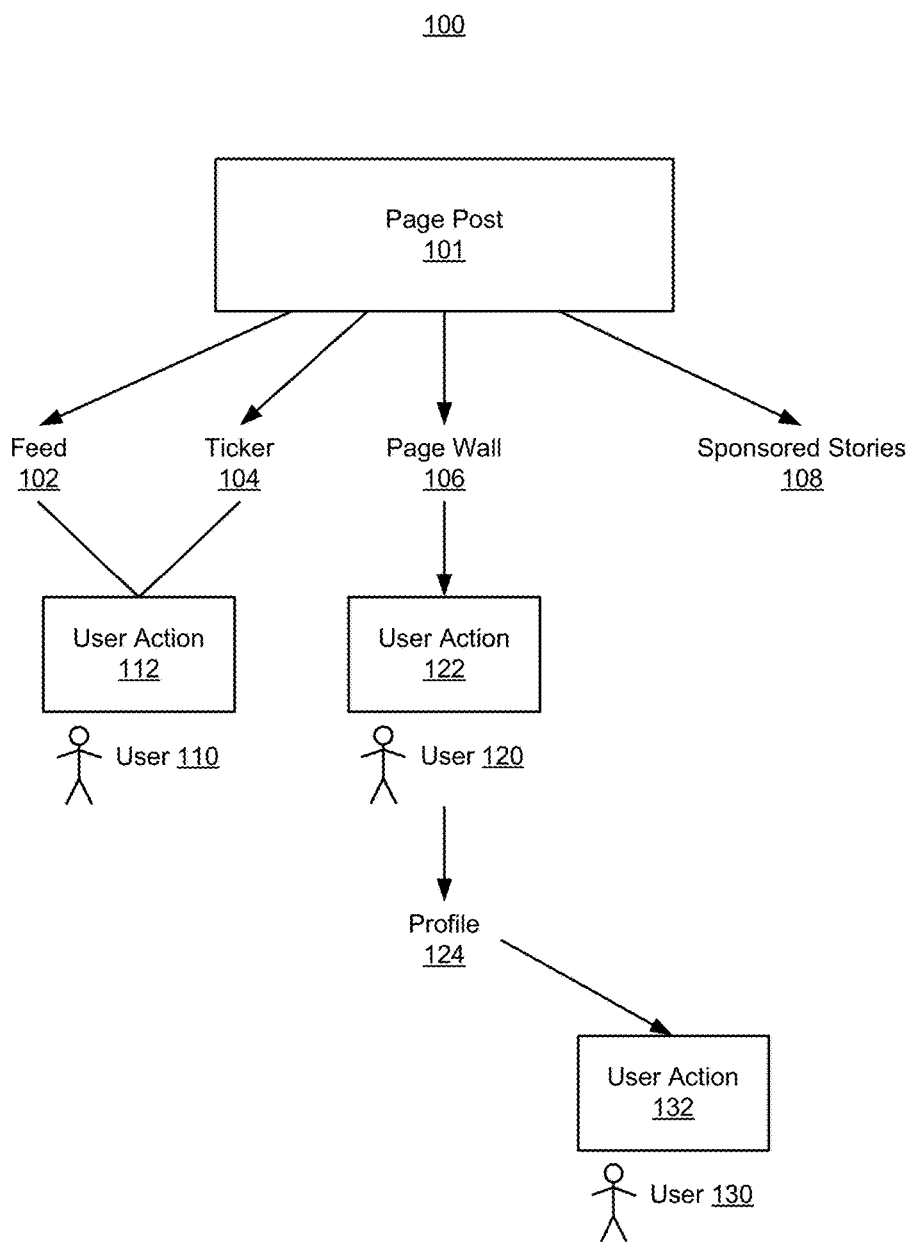
FIG. 1 is a diagram showing downstream propagation of conversions in a social networking system, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other social networking system users. Users join the social networking system and add connections to a number of other users to which they desire to be connected. Users of social networking system may provide information describing themselves, such as their age, gender, geographical location, education history, employment history and the like. The information provided by users may be used by the social networking system to recommend social groups, events, potential friends, other content, or other actions to the user.

In addition to declarative information provided by users, a social networking system may also record users' actions on the social networking system. Examples of user actions include communications with other users, sharing contents such as photos, interactions with posts, responding to a poll, adding an interest, joining an employee network, or any other suitable action. Data from websites or other sources external to the social networking system may also be stored by the social networking system. Examples of data stored from sources external to the social networking system include frequently visited websites, links followed, and other browsing data.

Content items distributed via the social networking system may encourage users to perform certain actions within the social networking system. Examples of content items include photos, videos, textual status updates, links to websites and user actions within and outside of a social networking system, may be shared by users with other users of a social networking system Examples of actions performed by a user with a content item include expressing a preference of a page presented via the social networking system (i.e., users may "like" the page), sharing a content item with other social networking system users, or commenting on a content item. Because of user actions, certain content items may be shared repeatedly, or otherwise disseminated, among users of the social networking system. Content items that are likely to be shared or distributed to other users are "viral" content items, which may include any type of user generated content as well as advertisements shared by users of the social networking system.

A user interaction with content items, such as posts and ads, in the social networking system may be referred to as a "conversion" or "conversion event." Because of the range of actions between social networking system users and content items, various types of conversions with content items distributed via a social networking system are possible. As described above, examples of user interactions with content items include: viewing a photo, playing a video, following a link, pinning a post, liking a content item, commenting on a content item, becoming a fan of a content item, sponsoring a post, registering for a service, joining an event, participating a poll, voting online, and claiming an offer for a product or service, and any other suitable actions supported by the social networking system. Accordingly, a user, such as a brand owner associated with a brand page that injects content items into the social networking system, may identify various types of actions that can be performed on a content item as a conversion, allowing the user to track specified types of user actions affecting content items presented by the social networking system. Hence, users may identify specific actions as conversions associated with content items to track occurrences of the specific type of actions when providing the content item to a social networking system.

Additionally, actions performed by a user of a social networking system may be published as a new content item on the social networking system. Content items describing actions performed by a user may be described as "stories." As stories identify a user performing an action, an action, and may also identify a content item on which the action was performed, actions performed by a social networking system user may attributed to content items presented to the user prior to performance of the actions. For example, an action identified in a story may be attributed to the content item (e.g., an advertisement, a page, a post of content, etc.) included in the story.

Reliable information about how users were influenced to perform certain actions and what content items were presented to those users is valuable to page administrators and other users to determine the effectiveness of their posted content on the system. For example, a brand owner's post or ad that includes one picture may be more effective than a post or ad including a different picture in getting other users to comment. Tracking conversions provides posting users with a better understanding of effectiveness of content items, e.g., in increasing engagement with a brand, bringing users to a physical location associated with an event or brand, or in providing another beneficial outcome to the user.

Various methods may be used to attribute a content item with an action performed by a user. In one embodiment, the content item most recently presented to a user before an action was performed is associated with the action. Alternatively, a content item presented to a user connected to a user connected to the user performing the action is identified as the presented content item causing the action. Machine learning, heuristics analysis, and statistical analysis may be used to associate presentation of a content item with a user action.

FIG. 1 is a block diagram of one embodiment of downstream propagation of conversions in a social networking system 100. In the example shown by FIG. 1, user interactions associated with a page post 101 in the social networking system 100 are tracked. As described above, a various types of interactions may be performed via the social networking system 100. Examples of interactions include: commenting on a photo album, communicating messages or content between users, becoming a fan of a musician, joining an event to a calendar, or any other suitable action. Users may perform interactions involving content items presented via the social networking system 100.

In one embodiment, user interactions identified by the social networking system 100 are published to other social networking system users through one or more communication channels. FIG. 1 shows examples of communication channels including a news feed 102, a news ticker 104, a posting associated with a page 106, a posting associated with a user profile 124, and one or more sponsored stories 108. Distribution of sponsored stories 108, for which an advertiser compensates the social networking system 100 to distributed to users, may be readily tracked, allowing interactions with a sponsored story 108 to be readily identified. However, communication of the page post 101 through other communication channels, such as the news feed 102, the news ticker 104, the page 106, and the profile 124 are more organic distribution channels allowing the page post 101 to be communicated to other users. These interactions with the page post 101 via these alternative communication channels are more difficult to track and analyze.

As shown in FIG. 1, the page post 101 may be distributed to users via a news feed 102, a news ticker 104, or through postings associated with a page (e.g., presentation of the page post 101 on a wall associated with the page) 106. Hence, user 110, which is connected to the page, may receive the page post 101 via a news feed 102 or via a news ticker 104; alternatively, an additional user 120 may be presented the page post 101 by viewing the page or a wall associated with the page. After viewing the page post 101, the user 110 performs an action 112, such as commenting on the page post 101, expressing an interest in page post 101, sharing the page post 101 with other users, performing a custom action on the page post 101, accessing a link within the page post 101, checking-in to a location associated with the page post 101, or any other interactions with the page post 101. Similarly, the additional user 120 performs an action 122 after being presented with the page post 101.

Actions performed by the user after being presented with the page post 101 may also be distributed to other social networking system users. For example, FIG. 1 shows distribution of the action 122 by the additional user 120 to another user 130 by presenting the action 122 in a user profile 124 associated with the additional user 120 in the social networking system 100. For example, a user profile 124 of the additional user 120 identifies recent activity of the additional user 120. As another example, the action 122 of the additional user 120 is presented to the other user 130 via a news feed 102, via a news ticker 104, or via any other suitable communication channel. The other user 130 viewing the action 122 by the additional user 120 may subsequently perform an action 132. Hence, presentation of the page post 101 to the user 110 and to the additional user 120 influences the action 132 performed by the other user 130. In the example of FIG. 1, presentation of the page post 101 caused the action 122 communicated to the other user 130 and prompting the action 132 by the other user 130.

Because actions may be influenced by previously performed actions, presentation of content, such as the page post 101, may be attributed to actions originating from viewing the content item as well as attributed to subsequent actions based on the actions originating from viewing the content item. Thus, the action 132 by the other user 130 in FIG. 1 may be associated with the page post 101. While FIG. 1 illustrates a total of three users and two levels for distribution of actions, other embodiments may include a greater number of users and/or levels of communication. Additionally, actions may be tracked for a specified time period, which may vary depending on types of actions. For example, a check-in to a specific location may be tracked within 24 hours of the check-in, while expressing a preference for a post may be tracked for a week after the preference was expressed.

System Architecture

Figure 2:
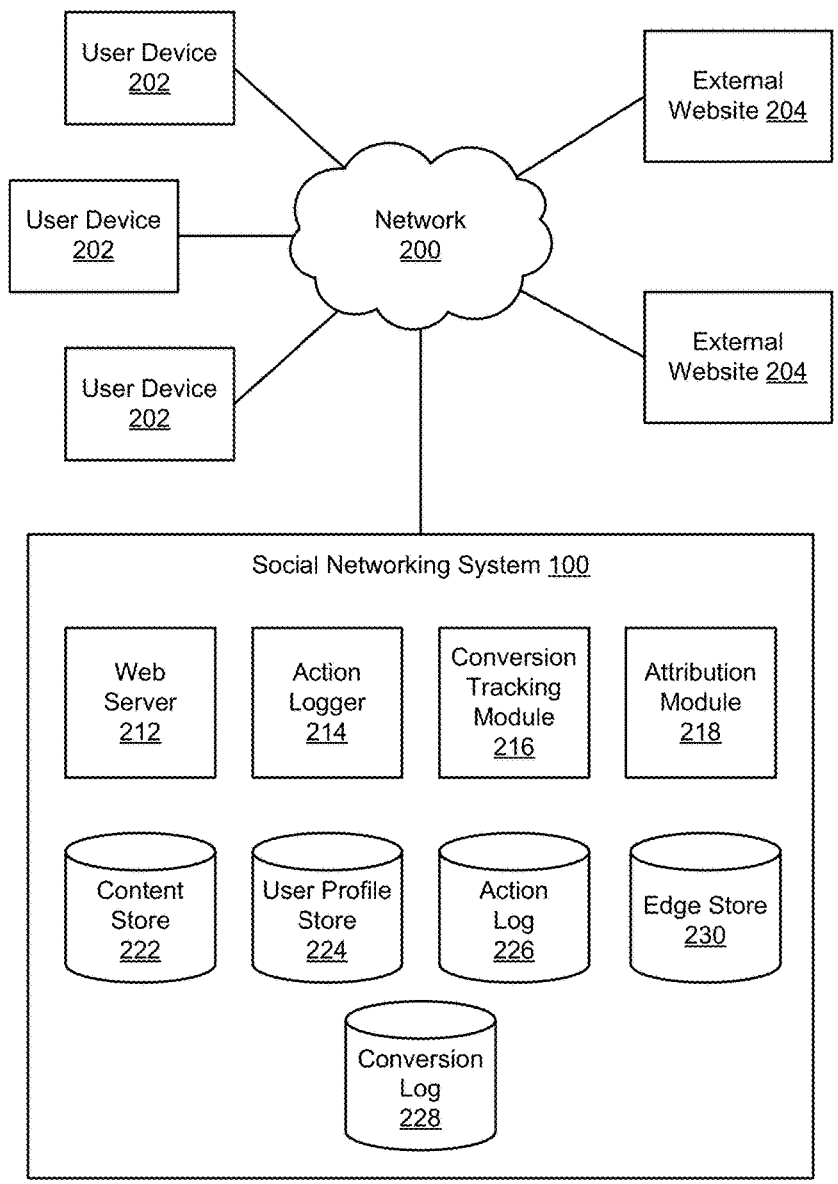
FIG. 2 is a high level block diagram of a system environment suitable for organic conversion tracking in a social networking system, in accordance with one embodiment.

FIG. 2 is a high level block diagram illustrating one embodiment of a system environment for organic conversion tracking. The system environment comprises a network 200, one or more user devices 202A, 202B, 202C (also referred to individually and collectively using reference number 202), one or more external websites 204A, 204B (also referred to individually and collectively using reference number 204), and the social networking system 100. In alternative configurations, different and/or additional modules can be included in the system.

The user devices 202 comprise one or more computing devices capable of processing data, receiving input from a user, as well as transmitting and receiving data via the network 200. In one embodiment, the user device 202 is a conventional computer system executing, for example, a Microsoft WINDOWS®-compatible operating system (OS), Apple OS X, and/or a Linux distribution. In another embodiment, the user device 202 may be any device having computer functionality, such as a personal digital assistant (PDA), mobile telephone, smart-phone, etc. In one embodiment, the user device 202 executes an application, such as a browser application, allowing a user of the user device 202 to interact with the social networking system 100. In another embodiment, the user device 202 interacts with the social networking system 100 through an application programming interface (API) that runs on a native operating system of the user device 202, such as IOS® or ANDROID™.

The user devices 202 are configured to communicate via a network 200, which may comprise any combination of local area and/or wide area networks, using both wired and wireless communication systems. In one embodiment, the network 200 uses standard communications technologies and/or protocols. Thus, the network 200 may include links using technologies such as Ethernet, 802.11, worldwide interoperability for microwave access (WiMAX), 3G, 4G, CDMA, digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). One or more third party websites 204 may be coupled to the network 200 for communicating with the social networking system 100, which is further described below.

The social networking system 100 includes a web server 212, an action logger 214, a conversion tracking module 216, an attribution module 218, a content store 222, a user profile store 224, an action log 226, a conversion log 228, and an edge store 230. In other embodiments, the social networking system 100 may include fewer or additional, and/or different modules for various applications. Conventional components such as network interfaces, security functions, load balancers, failover servers, management and network operations consoles, and the like are not shown so as to not obscure the details of the system.

Each user of the social networking system 100 is associated with a user profile, which is stored in the user profile store 224. User account information, such as a unique user identification (ID), a login name and password, and other related information for a user are stored in the user profile store 224. In one embodiment, the user account information is indexed by the user ID or by other suitable information. A user profile includes declarative information about the user that was explicitly shared by the user, and may also include profile information inferred by the social networking system 100. In one embodiment, a user profile includes multiple data fields, each data field describing one or more attributes of the corresponding user of the social networking system 100. The user profile information stored in user profile store 224 describes the users of the social networking system 100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. A user profile in the user profile store 224 may also maintain references to actions by the corresponding user performed on content items in the content store 222 and stored in the action log 226.

While user profiles in the user profile store 224 are frequently associated with individuals, allowing people to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 222 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 100, such as status updates, photos tagged by users to be associated with other objects in the social networking system, events, groups or applications. In some embodiments, objects are received from third-party applications or third-party applications separate from the social networking system 100. Content "items" represent single pieces of content that are represented as objects in the social networking system 100. Users of the social networking system 100 are encouraged to communicate with each other by posting text and content items of various types of media through various communication channels, increasing the interaction of users with each other and increasing the frequency with which users interact within the social networking system 100.

The action logger 214 receives communications about user actions on and/or off the social networking system 100, populating the action log 226 with information about user actions. Such actions may include, for example, adding a connection to another user, sending a message to another user, uploading an image, reading a message from another user, viewing content associated with another user, attending an event posted by another user, among others. In some embodiments, the action logger 214 identifies interaction between a social networking system user and a brand page within the social networking system 100, which communicates targeting criteria associated with content on the brand page to a content selector to customize content from the brand page. In addition, a number of actions described in connection with other objects are directed at particular users, so these actions are associated with those users as well. These actions are stored in the action log 226.

The action log 220 may be used by the social networking system 100 to track user actions on the social networking system 100, as well as external website that communicate information to the social networking system 100. Users may interact with various objects on the social networking system 100, including commenting on posts, sharing links, and checking-in to physical locations via a mobile device, accessing content items or other interactions. Information describing these actions is stored in the action log 220. Additional examples of interactions with objects on the social networking system 100 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with content on the social networking system 100 as well as other applications operating on the social networking system 100. In some embodiments, data from the action log 220 is used to infer interests or preferences of the user, augmenting the interests included in the user profile and allowing a more complete understanding of user preferences. In one embodiment, an entry in the action log 226 comprises a user identifier, a conversion identifier, a content item identifier (e.g., a post identifier, an ad identifier, a recommendation unit identifier), and a timestamp of the conversion. For example, an entry in the action log 226 has the format:

{user_id, conversion_id, content_id, timestamp}

In one embodiment, entries in the action log 226 are indexed by the user identifier and the conversion identifier to expedite retrieval of data from the action log 226.

The action log 220 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action log 220 records data about these users, including webpage viewing histories, posted items that were engaged, purchases made, and other patterns from shopping and buying.

In one embodiment, an edge store 230 stores the information describing connections between users and other objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system.

The edge store 230 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. A user's affinity may be computed by the social networking system 100 over time to approximate a user's affinity for an object, interest, and other users in the social networking system 100 based on the actions performed by the user. Computation of affinity is further described in U.S. patent application Ser. No. 12/978, 265, filed on Dec. 23, 2010, which is hereby incorporated by reference in its entirety. Multiple interactions between a user and a specific object may be stored in one edge object in the edge store 230, in one embodiment. In some embodiments, connections between users may be stored in the user profile store 205, or the user profile store 205 may access the edge store 230 to determine connections between users.

The web server 212 links the social networking system 100 via the network 200 to one or more user devices 202, as well as to one or more external websites 204. The web server 212 serves web pages, as well as other web-related content, such as JAVA®, FLASH®, XML and so forth. The web server 212 may provide the functionality of receiving and routing messages between the social networking system 100 and the user devices 202, for example, instant messages, queued messages (e.g., email), text and SMS (short message service) messages, or messages sent using any other suitable messaging technique. A user may send a request to the web server 212 to upload information, for example, images or videos that are stored in the content store 222. Additionally, the web server 212 may provide API functionality to send data directly to native client device operating systems, such as IOS®, ANDROID™, WEBOS® or RIM.

The conversion tracking module 216 receives a content item from a posting user and a conversion definition associated with the content item. The conversion definition specifies a type of interaction with the content item to be tracked. In one embodiment, the conversion tracking module 216 provides a user interface to the posting user to specify the conversion definition, allowing the posting user to customize the interactions with the content item that are tracked.

Figure 3:
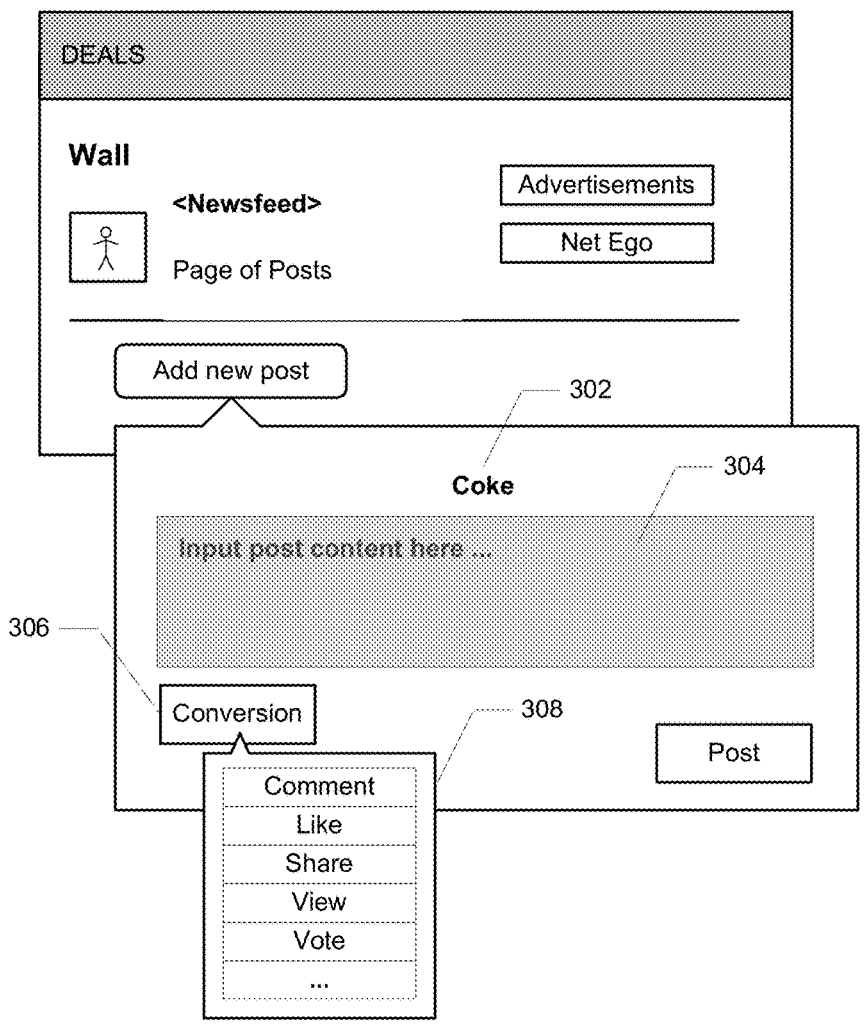
FIG. 3 is an example interface for associating a conversion definition with a content item, in accordance with an embodiment.

FIG. 3 is an example interface 300 provided to the posting user by the conversion tracking module 216 via the web server 212. In the embodiment shown by FIG. 3, the interface 300 receives information for generating a post of content, although the interface 300 may receive information describing any other type of content item. For example, the posting user specifies a title 302 of the page post and content 304 comprising the page post.

The interface 300 includes a conversion definition interface 306 that allows the posting user to specify a type of interaction with the content item to be tracked. In the example of FIG. 3, the conversion definition interface 306 presents a listing 308 of types of interactions, allowing selection of a type of interaction to be tracked. The listing 308 of types of interactions may include preselected types of interactions, such as commenting, liking, sharing, viewing, voting, or other interactions. The listing 308 or the conversion definition interface 306 may also allow a posting user to specify a customized type of interaction or manually identify an interaction. Identifying a conversion definition causes the social networking system 100 to identify interactions with the content item having the interaction type corresponding to the selected conversion definition. In one embodiment, the conversion tracking module 216 identifies interactions with the content item having the interaction type corresponding to the selected conversion definition from the action log 226. For example, the conversion definition may be defined as {action_type, post_id, . . . }, where the action_type corresponds to any action a user can perform in the social networking system to an content item (e.g., liking photos, commenting on posts, sharing ads, tagging other users, and claiming offers), as well as open graph actions eligible for conversion tracking Note that a user may have the flexibility to define conversion on any actions in the social networking system 100, including those actions unrelated to the user's own content item. For example, an administrator for a sunflower page post or ad may track conversions for any user that likes a soft drink product.

Based on a specified conversion definition associated with a content item, the conversion module 216 determines one or more metrics describing conversions associated with the content item. An attribution module 218 analyzes user actions stored in the action log 226 to identify a content item associated with a user action. Identifying the content item associated with an interaction allows data describing the specified type of conversion definition to be generated. Various methods may be used to associate an action with an interaction. Examples of methods for associating an interaction with a content item include statistical analysis, heuristics analysis, and machine learning. For example, the attribution module 218 determines probabilities for associating a content item with an action based on previously stored information associating similar content items with types of interactions.

The attribution module 218 may use several rules and weighted factors in a scoring model to associate content items with actions. For example, more recent interactions may be more heavily weighted. Alternatively, the content item initially presented to a user subsequently performing an action is associated with the action. In another embodiment, a scoring model is used to generate scores for candidate content items presented to a user performing an action. Various factors may be used to score the candidate content items. Example factors include affinity of the user performing the action to the content item, age of the content item, prior association of the content item with other actions, or other suitable factors. Factors may be associated with different weights to select a content item associated with an action. The weights may be initially assigned by a posting user who posted the content item. In one embodiment, the weights may be adjusted over time feedback and results of machine learning. Regression analysis may also be used to optimize weights in the scoring model.

In one embodiment, when a content item is distributed to users via the social networking system 100, the conversion tracking module 216 stores a conversion record associated with the content item in the conversion log 228. Metrics describing conversions associated with the content item are stored and associated with the conversion record in the conversion log 228. For example, a conversion record includes a content item identifier, a description of the type of interaction selected as the conversion definition. Actions recorded by the action logger 214 associated with the content item and having the interaction type corresponding to the conversion definition are associated with the conversion record. This allows more efficient retrieval of actions with the content item having a specified interaction time.

Using data stored in the conversion log 228, the conversion tracking module 216 generates one or more metrics describing interactions with a content item having the conversion definition. In one embodiment, data describing attribution of content items to one or more actions may also be provided by the conversion tracking module 216. Examples of metrics include virality metrics, reach metrics, and engagement metrics. Virality metrics describe how quickly a content item was distributed throughout the social networking system and/or the rate with which the content item is replicated over time. Tracking of the virality metric is further described in U.S. patent application Ser. No. 13/689,441, filed on Nov. 29, 2012, which is hereby incorporated by reference in its entirety. Reach metrics describe the number of unique users interacting with the content item that matches the conversion definition. For example, the reach metric may identify a number of unique users sharing a page or a number of unique users commenting on a post. Reach metrics may also be segmented based on demographics, geographic location, types of user actions, and other user characteristics. Computation of the reach metric is further described in U.S. patent application Ser. No. 13/627,945, filed on Sep. 26, 2012, which is hereby incorporated by reference in its entirety. Engagement metrics describe levels of user engagement with the social networking system 100 based on the virality of a content items, user interactions with the content item based on interactions with the content item by other users connected to the user, and frequency of user interactions with content items.

Tracking Organic Conversion

Figure 4:
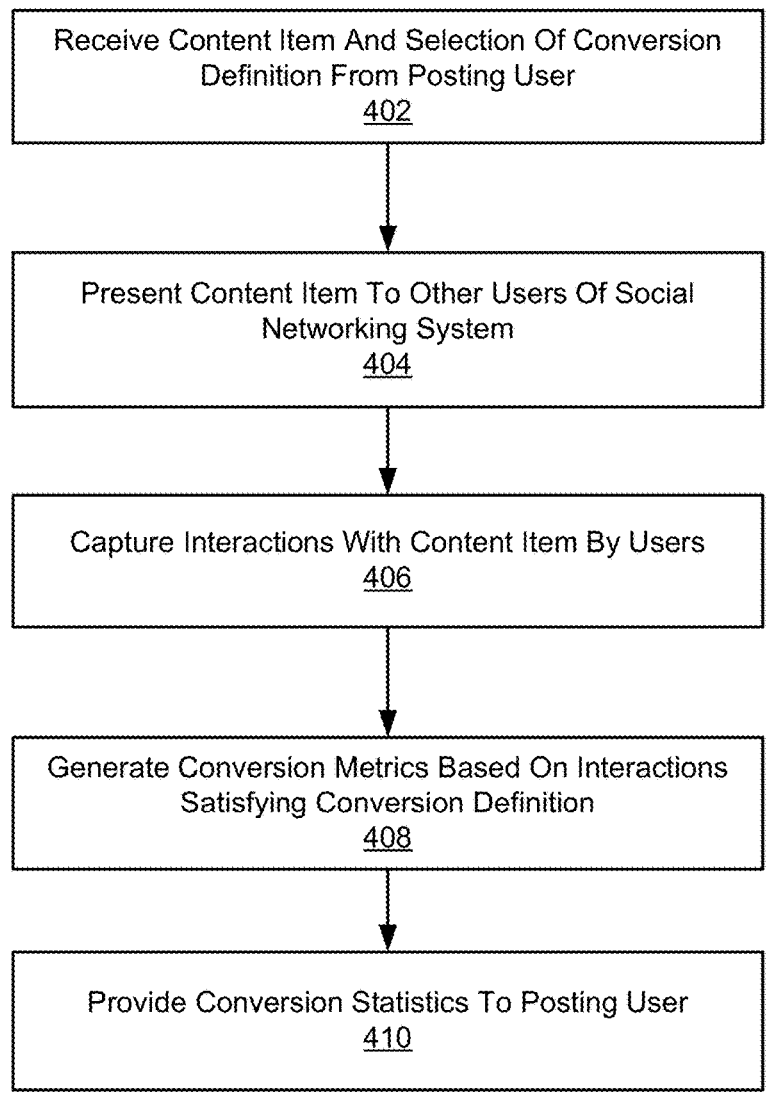
FIG. 4 is a flowchart of a process of tracking user interactions with content items in a social networking system, in accordance with an embodiment.

FIG. 4 is a flowchart of one embodiment of a process for tracking user conversion in a social networking system 100. In one embodiment, the steps illustrated in FIG. 4 are performed by the conversion tracking module 216. However, in other embodiments, the steps may be performed by any suitable component of the social networking system 100.

The conversion tracking module 216 receives 402 a content item and also receives a conversion definition associated with the content item. The conversion definition identifies a type of interaction with the content item, allowing a posting user providing the content item to identify a type of interaction with the content item to track and analyze. For example, a posting user communicates content for generating a post and a conversion definition specifying a type of interaction with the post to the conversion tracking module 216.

Additional users of the social networking system 100 are presented 404 with the content item. In one embodiment, a new conversion entry identifying the posting user, the content item and the conversion definition is stored in the conversion log 228. Interactions by the additional users with the content item are captured 406 by the action logger 214 and stored in the action log 226. Examples of interactions captured 406 by the action logger 214 include viewing a content item (e.g., viewing a photo and playing a video), accessing content included in a content item (e.g., following a link and voting in a poll), commenting on a content item, indicating a preference for a content item (e.g., liking photos), sponsoring a content item, sharing a content item, checking-in to a location associated with the content item, saving a content item, deleting a content item, tagging a content item (e.g., pinning a post, adding a link to bookmark and marking a message as spam), or any other interactions supported by the social networking system, as well as information related to the interactions, such as when/where/ through what devices has the user interacted with the content item, with whom has the user shared the content item, and has the content item been further shared. In one embodiment, information describing an interaction with a content item is captured 406 and stored in real time. Alternatively, information describing in action is captured 406 when the action is performed and stored in the action log 226 at specified intervals.

After presentation of the content item, one or more metrics based on user interactions with the content item having the interaction type specified by the conversion definition are generated 408. In one embodiment, the conversion metrics are generated 408 responsive to a request from the posting user. Alternatively, the conversion metrics are generated 408 at a specified time interval. Example conversion metrics include a number of unique interactions having the type of interaction specified by the conversion definition, rate of interactions having the type of interaction specified by the conversion definition occurring, and a number of interactions having the type of interaction specified by the conversion definition occurring in a time interval. The time period used for generating 408 certain conversion metrics may be specified or may vary depending on the type of interaction. The conversion metrics are then provided 410 to the posting user. In one embodiment, the conversion metrics are provided 410 along with other data describing interactions with the content item. For example, a content item associated with the posting user is presented 404 and the posting user provides a conversion definition identifying a particular interaction with the content item. The conversion metrics then may identify a number of users who performed the identified action within a particular date range.

Figure 5:
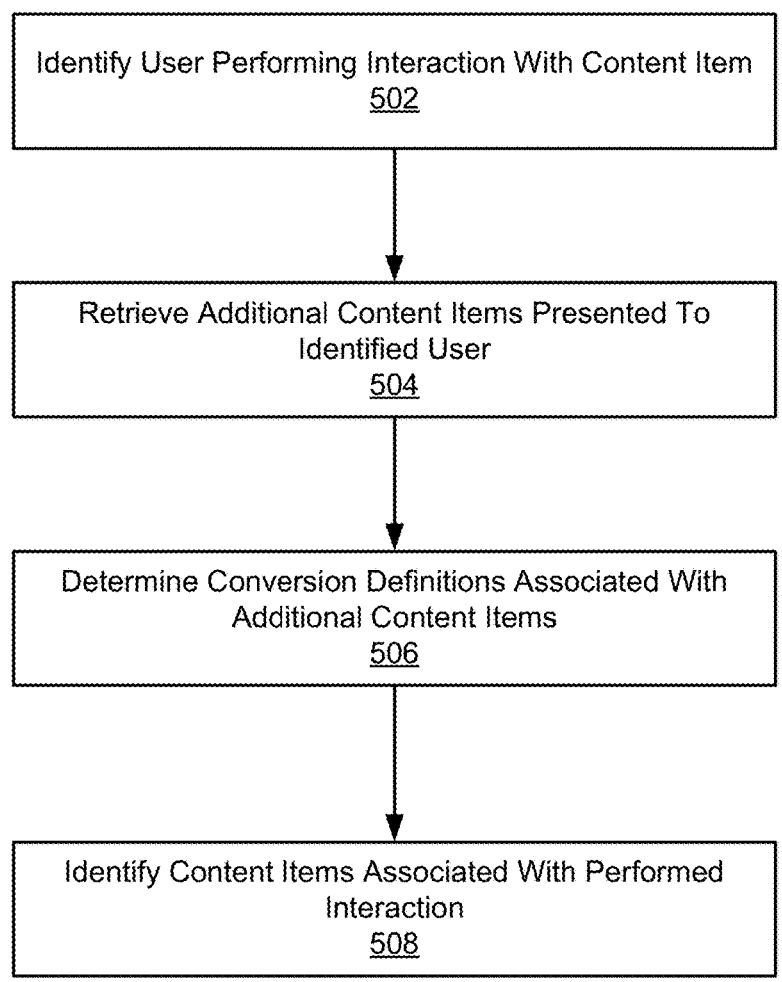
FIG. 5 is a flowchart of a process for associating content items with interactions by users of a social networking system, in accordance with an embodiment.

In one embodiment, the social networking system 100 also associates an interaction having an interaction type specified with a conversion definition with a content item. FIG. 5 is a flowchart of one embodiment of a process associating interactions with content items. For example, the steps illustrated in FIG. 5 can be performed by the attribution module 218. In other embodiments, the actions described in conjunction with FIG. 5 are performed by any suitable component of the social networking system 100.

In one embodiment, a user performing an interaction with a content item having a type of interaction matching a type of interaction specified in a conversion definition is identified 502. For example, a user identifier is determined for the user performing the interaction. Additional content items presented to the identified user are retrieved 504 from the action log. In one embodiment, additional content items presented to the identified user prior to a timestamp associated with the interaction having the type of interaction specified in the conversion definition are retrieved 504. Conversion definitions associated with the additional content items are retrieved from the conversion log 228 based on identifiers associated with the additional content items.

From the interaction performed with the content item and the retrieved data associated with the additional content items presented to the user, the attribution module 218 identifies one or more content items presented to the user that are associated with the interaction performed by the user. For example, a scoring model including rules and weighted factors is applied to the content item and to the additional content items to identify a content item associated with the interaction. In one embodiment, the content item presented or accessed most recently before the interaction is identified 508 as the content item associated with the performed interaction. Alternatively, the content item initially presented to the user is identified 508 as the content item associated with the performed interaction. Other criteria may also be applied to identify 508 the content item associated with the interaction. Examples of criteria for identifying 508 a content item associated with an interaction include whether the interaction was performed within a time period from presentation of a content item, prior associations between a content item and interactions having the same type of interaction, or other suitable criteria.

The content item associated with a performed interaction may be provided to a posting user. In one embodiment, association between the content item and one or more interactions may be presented along with the conversion statistics described above. A variety of metrics describing attribution of content items to a performed interaction may be presented to provide users with information about content items influencing users to perform one or more types of interactions. This allows users to more effectively understand the effect of their posted content.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving, via a first user interface, a content item from a posting user for presentation to a plurality of other users in a social networking system;
    presenting, via the first user interface, the posting user with a plurality of conversion definitions, each conversion definition describing a type of interaction with the content item to be tracked by the social networking system;
    receiving, via the first user interface, a selection of a conversion definition from the posting user selected from the plurality of conversion definitions, the selected conversion definition describing a first type of interaction with the content item;
    presenting, via a second user interface, the content item to one or more of the plurality of other users of the social networking system;
    receiving, via the second user interface, one or more interactions between at least a subset of the plurality of other users of the social networking system with the content item;
    identifying one or more of the received interactions with the content item having the first type of interaction described by the selected conversion definition, wherein the identifying comprises:
        retrieving additional content items previously presented to an additional user of the plurality of other users performing an interaction with the content item having the type of interaction described by the selected conversion definition; and
        determining whether to associate the content item or an additional content item with the performed interaction by:
    generating a score for each of the additional content items based on one or more attributes of the additional content items; and
        associating the performed interaction with an additional content item of the additional content items based on the scores;
    generating one or more metrics describing the identified interactions with the content item having the first type of interaction described by the selected conversion definition; and
    providing the one or more generated metrics describing the identified interactions to the posting user.

2. The method of claim 1, wherein the content item is posted by an administrator of a page maintained in the social networking system.

3. The method of claim 1, wherein the type of interaction is selected from a group consisting of: viewing the content item, indicating a preference for the content item, commenting on the content item, checking-in to a location associated with the content item, accessing content included in the content item, and any combination thereof.

4. The method of claim 1, wherein a metric describing the identified interactions comprises a number of unique interactions having the type matching a type of interaction associated with the selected conversion definition.

5. The method of claim 1, wherein a metric describing the identified interactions comprises a frequency of occurrence of interactions having the type matching a type of interaction associated with the selected conversion definition.

6. The method of claim 1, wherein receiving the interactions between at least the subset of the additional users of the social networking system with the content item comprises:
    generating data including an identifier associated with the content item with an identifier associated with an additional user, a type associated with a received interaction and a timestamp associated therewith; and
    storing the generated data in a storage device.

7. The method of claim 1, wherein determining whether to associate the content item or the additional content item with the performed interaction further comprises:
    determining probabilities of associating each of the additional content items with the performed interaction based on stored associations between content items and types of interactions;
    determining a probability of associating the content item with the performed interaction based on stored associations between content items and types of interactions; and
    associating the performed interaction with the content item or with one or more additional content items based on the determined probabilities of associating the additional content items and the probability of associating the content item.

8. The method of claim 1, wherein determining whether to associate the content item or the additional content item with the performed interaction further comprises:
    determining content items presented to the additional user before the additional user performed the interaction with the content item having the type of interaction associated with the selected conversion definition; and
    associating a content item presented to the user most recently before the additional user performed the interaction with the content item with the interaction with the content item having the type of interaction associated with the selected conversion definition.

9. The method of claim 1, wherein determining whether to associate the content item or the additional content item with the performed interaction further comprises:
    determining content items presented to the additional user before the additional user performed the interaction with the content item having the type of interaction associated with the selected conversion definition; and associating a content item first presented to the user before the additional user performed the interaction with the content item with the interaction with the content item having the type of interaction associated with the selected conversion definition.

10. The method of claim 1, wherein one or more attributes of the additional content items are selected from a group consisting of:

an affinity of an additional user performing an interaction having type matching a type of interaction associated with the selected conversion definition for an additional content item, an age of the additional content item, a prior association of the additional content item with types of interactions, and any combination thereof.

11. The method of claim 1, wherein weights are associated with one or more of the one or more attributes of the additional content items.

12. A method comprising:

receiving, via a first user interface, a content item from a posting user for presentation to a plurality of other users via a social networking system;

receiving, via the first user interface, a conversion definition from the posting user associated with the content item, the conversion definition identifying a type of interaction with the content item;

presenting the content item to one or more other users of the social networking system via a second interface;

receiving, via the second user interface, one or more interactions between at least a subset of the one or more other users of the social networking system with the content item;

identifying one or more of the received interactions with the content item having the first type of interaction identified by the conversion definition, wherein the identifying comprises:

retrieving additional content items previously presented to an additional user of the plurality of other users performing an interaction with the content item having the type of interaction described by the selected conversion definition; and determining whether to associate the content item or an additional content item with the performed interaction by:

generating a score for each of the additional content items based on one or more attributes of the additional content items; and associating the performed interaction with an additional content item of the additional content items based on the scores;

generating one or more metrics describing the identified interactions with the content item having the first type of interaction identified by the conversion definition; and providing the one or more generated metrics describing the identified interactions to the posting user.

13. The method of claim 12, wherein the content item is posted by an administrator of a page maintained in the social networking system.

14. The method of claim 12, wherein the type of interaction is selected from a group consisting of: viewing the content item, indicating a preference for the content item, commenting on the content item, checking-in to a location associated with the content item, accessing content included in the content item, and any combination thereof.

15. The method of claim 12, wherein a metric describing the identified interactions comprises a number of unique interactions having the type matching the type of interaction identified by the conversion definition.

16. The method of claim 12, wherein a metric describing the identified interactions comprises a frequency of occurrence of interactions having the type matching the type of interaction identified by the conversion definition.

* * * * *